April 25, 1944.　　　　L. C. LYLE　　　　2,347,273
MEASURING TAPE
Filed June 3, 1943
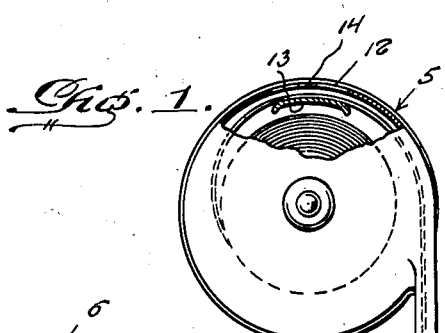
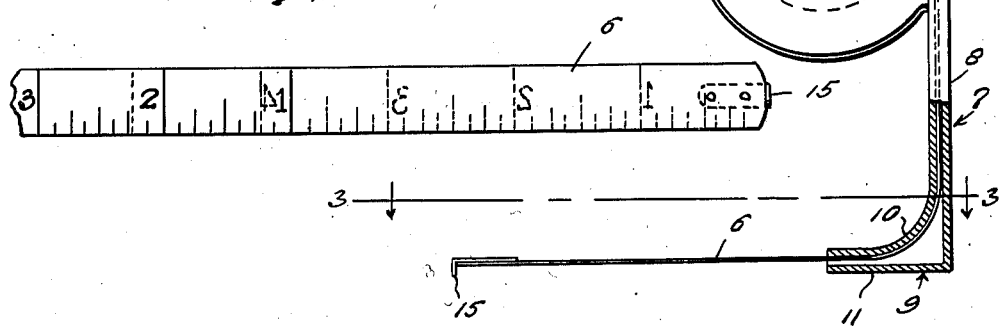
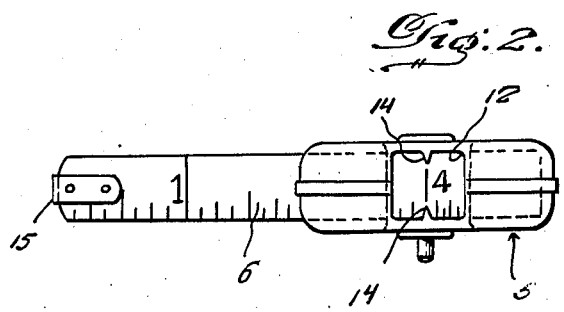
Inventor
Leascher C. Lyle,
Attorneys Patented Apr. 25, 1944

2,347,273

UNITED STATES PATENT OFFICE 2,347,273

MEASURING TAPE

Leascher C. Lyle, McMinnville, Tenn.

Application June 3, 1943, Serial No. 489,515

1 Claim. (Cl. 33—138)

This invention relates to a measuring tape of the type including a steel tape and a reel mounting therefor whereby the tape may be paid out and taken in at the will of the user.

The primary object of this invention is the provision of an improved means for guiding the movement of the tape into and out of the reel housing and which provides an efficient grip for the user to grasp for facilitating the handling of the device especially when locating the extended portion of the tape with relation to an area to be measured and which locates the reel housing so as not to interfere with the reading of the scale markings on one side of the tape.

Another object of this invention is the provision of scale markings on both sides of the tape, the scale marking on one side of the tape is to be read from a sight opening in the reel housing while the scale marking on the other side of the tape is to be read from the free end of the tape to where the tape enters the combined guide means and grip of the reel housing with the same measurement result given by either group of scale markings.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation partly in section illustrating a measuring tape constructed in accordance with my invention.

Figure 2 is a top plan view illustrating the device.

Figure 3 is a sectional view taken on the line 3—3 of Figure 1.

Figure 4 is a plan view showing the scale markings in full lines upon one side of the tape and the scale markings on the opposite side of the tape being shown in dotted lines, bringing out the relative relation between the groups of scale markings.

Referring in detail to the drawing, the numeral 5 indicates a reel housing, the reel of which may be of a conventional construction for the purpose of supporting in the housing a measuring tape 6. This tape is of the steel type having arranged upon one face thereof a scale marking and upon the opposite face thereof another scale marking, as clearly shown in Figure 4. The steel tape may be paid out or taken in by the reel of the reel housing in the conventional way.

Formed on the reel housing 5 is a substantially L shaped throat extension 7 through which the tape 6 travels on its movement into and out of the housing 5. The extension 7 presents portions 8 and 9 arranged at right angles to each other. The portion 9 has a curved wall 10 extending from said portion into the portion 8 for guiding the movement of the tape 6. The portion 9 opposite the curved wall is provided with a flat wall 11 to permit the device to be rested evenly upon a surface with the tape extending horizontally from the extension 7, and with the reel housing disposed in a plane above the horizontally arranged portion of the tape and so located as not to obscure the reading of the scale marking upon the uppermost face of the extended portion of the tape so that said latter-named scale marking may be read from the free end of the tape to a point where the tape enters the extension 7.

The portion 8 is considerably longer than the portion 9 of the extension so that said portion 8 may be readily grasped by a person using the device, which will greatly facilitate the arrangement of the extended portion of the tape horizontally or in relation to an area to be measured with the reel housing positioned in a plane above the area or the extended portion of the tape whereby the user may look directly down on the reel housing through a sight opening 12 provided therein to read the scale marking from the other side of the tape.

A guide 13 is arranged in the reel housing under the sight opening 12 for guiding the tape in close relation to the sight opening. Oppositely arranged projections 14 are formed on opposed walls of the sight opening to provide an indicator for cooperation with the scale marking read through the sight opening. The scale marking which is read through the sight opening is so arranged on the tape with relation to the other scale marking that the same answer or result of the measurement taken can be had by the user either through observing the scale marking through the sight opening or the scale marking upon the top face of the extended portion of the tape.

It is preferable that the free end of the tape be provided with a stop 15 for limiting the movement of the tape into the extension.

The extension 7 will efficiently guide the tape into and out of the reel housing and will provide a very efficient grip for the handling of the device as well as a rest for the device on a surface and when thus positioned will permit a measurement reading to be easily obtained through a sight opening in the reel housing as well as directly from the extended portion of the tape.

While I have shown and described the preferred embodiment of my invention, it will be understood that minor changes in construction, combination and arrangement of parts may be made without departing from the spirit and scope of the invention as claimed.

Having thus described the invention, what I claim is:

In a measuring device, a tape reel including a housing having a sight opening, a tape adapted for movement into and out of the housing and having scales on opposite faces thereof, a substantially L shaped hollow extension having the tape passing therethrough and having one end formed on the casing for supporting the casing laterally of and for a considerable distance from one face of the tape extending from the free end of the extension, one of the scales being so arranged on the tape that the markings thereof visible through the sight openings will indicate the distance between the extended free end of the tape and the free end of the extension, said extension including right angularly disposed portions and a curved wall extending from one portion to the other portion for guiding the tape from one portion to the other portion, one of said portions having a flat face to engage a surface to support the extended portion of the tape substantially parallel to the surface and the housing in a plane above said extended portion of the tape and the surface, one of said portions of the extension being longer than the other portion of said extension to permit gripping thereof by a person for locating said extended portion of the tape in said relation to a selected portion of the surface and for positioning of said flat face on the surface.

LEASCHER C. LYLE.